United States Patent [19]

Schmidt

[11] Patent Number: 4,732,222
[45] Date of Patent: Mar. 22, 1988

[54] RAM BORING MACHINE WITH IMPACT BLADE PISTON

[75] Inventor: Paul Schmidt, Lennestadt, Fed. Rep. of Germany

[73] Assignee: Tracto-Technik Paul Schmidt Maschinenfabrik GmbH

[21] Appl. No.: 910,488

[22] Filed: Sep. 23, 1986

[30] Foreign Application Priority Data

Sep. 24, 1985 [DE] Fed. Rep. of Germany ....... 3533995

[51] Int. Cl.$^4$ ................. E21B 11/02; F16L 55/18
[52] U.S. Cl. ................................. 175/22; 175/295; 405/156; 405/184; 30/92.5
[58] Field of Search .................. 175/22, 19, 293, 295, 175/296; 405/154, 156, 184; 166/55, 55.1–55.3; 138/97; 30/92, 92.5

[56] References Cited

U.S. PATENT DOCUMENTS 4,505,302 3/1985 Streatfield et al. ................ 405/156
4,507,019 3/1985 Thompson ........................ 405/154

FOREIGN PATENT DOCUMENTS 2092701 8/1982 United Kingdom .
2124325 2/1984 United Kingdom .
2137719 10/1984 United Kingdom .
2137720 10/1984 United Kingdom .
2138532 10/1984 United Kingdom ............... 405/184

Primary Examiner—Stephen J. Novosad
Assistant Examiner—Bruce M. Kisliuk
Attorney, Agent, or Firm—Toren, McGeady & Associates

[57] ABSTRACT

In a ram boring machine for laying pipelines without trenching, a double blade that is axially moveable against a compression spring is housed in an impact tip and projects through slots in the impact tip. The double blade is struck by a striker piston and moves, during the breaking-up of an old pipe laid in the ground, substantially independently of the ram boring machine or of its housing. In this way substantially all the impact energy of the piston is used for the benefit of the breaking-up operation.

11 Claims, 4 Drawing Figures

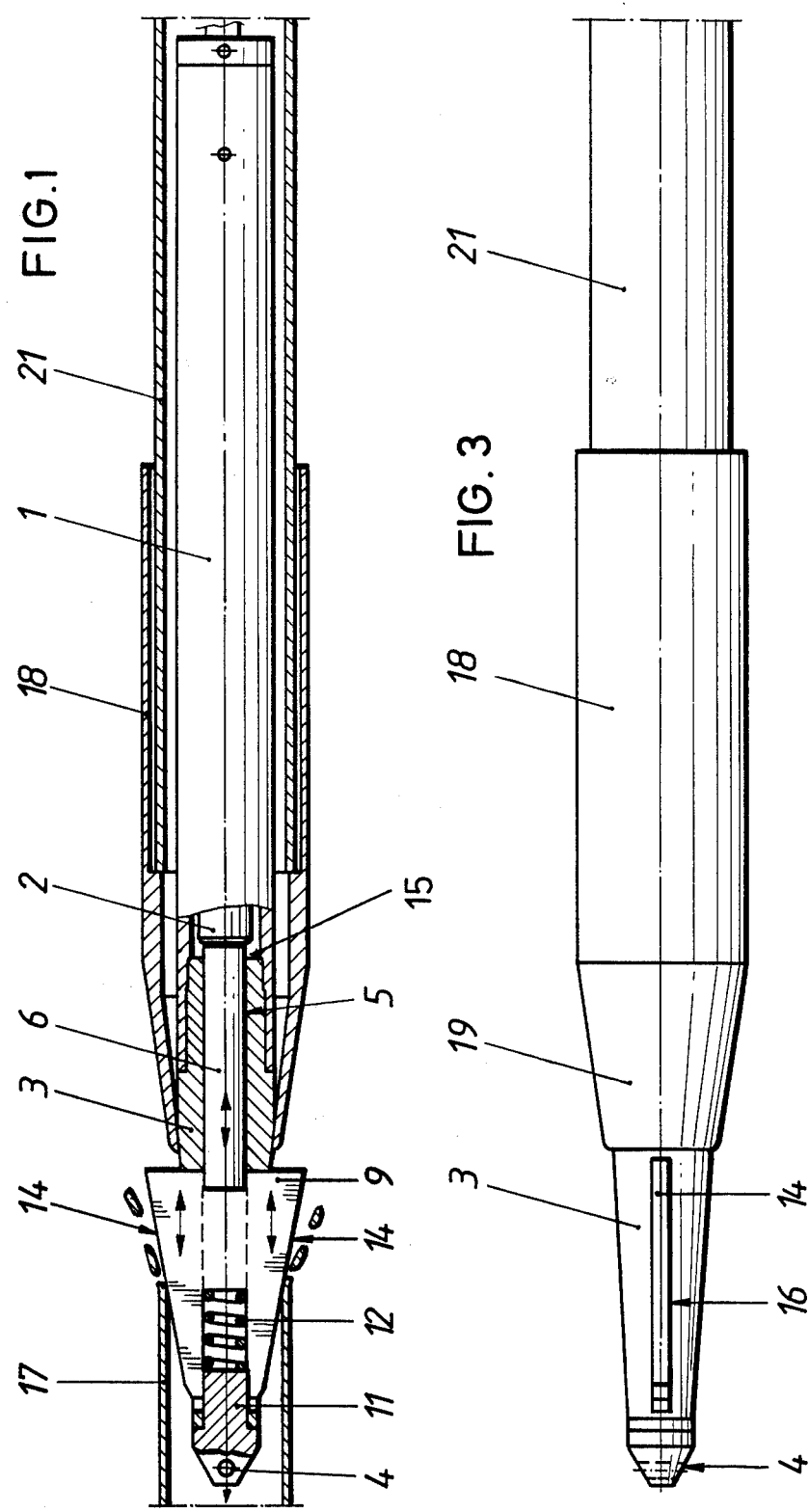

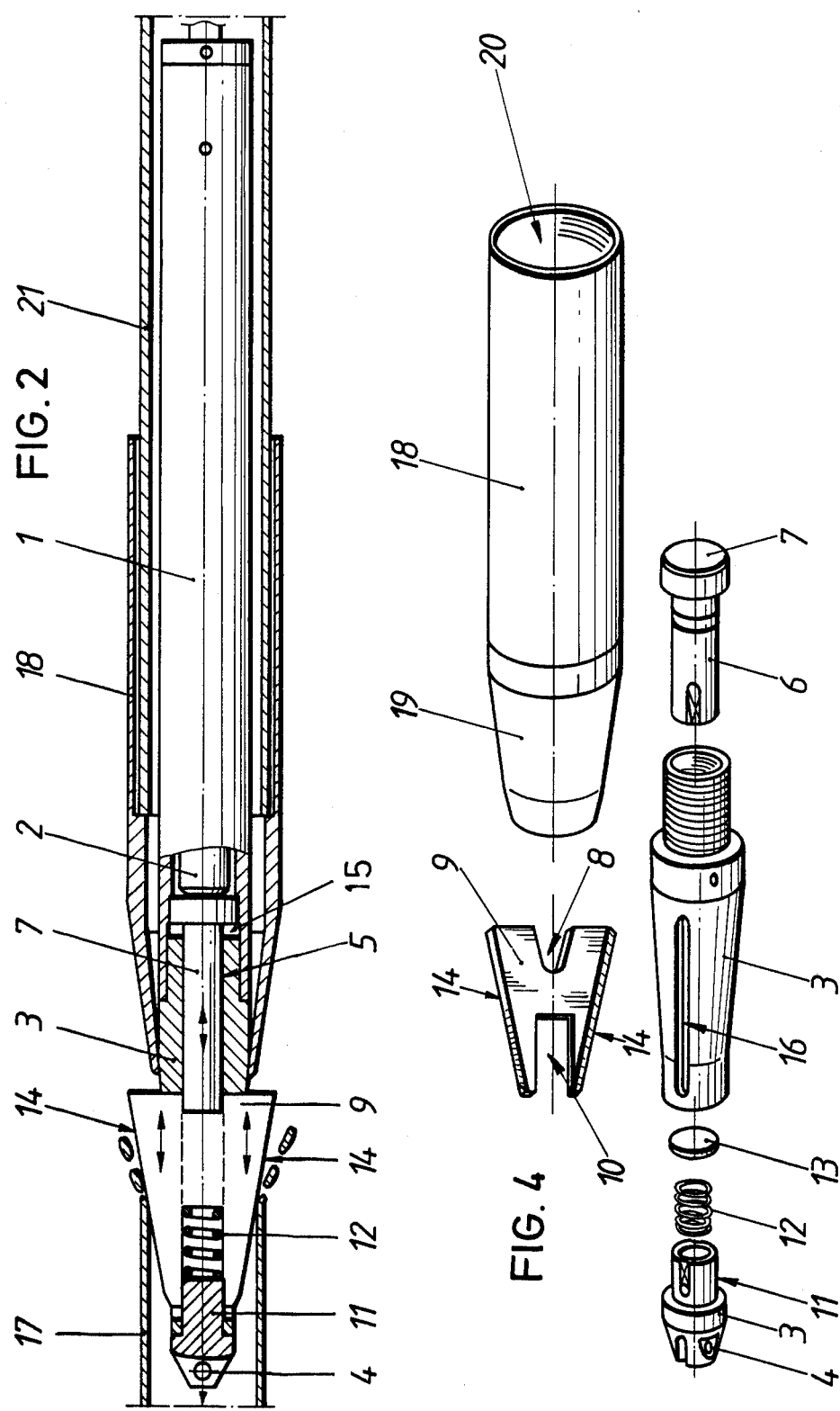

RAM BORING MACHINE WITH IMPACT BLADE PISTON

TECHNICAL FIELD OF THE INVENTION

The invention relates to a ram boring machine for laying pipelines without trenching, having a striker piston guided in the machine housing and an impact tip provided with impact blades.

BACKGROUND OF THE INVENTION AND PRIOR ART

A pneumatically driven ram boring machine of the above-mentioned kind is known from German patent specification No. 21 57 259. It has a moveable impact tip on which the self-guiding piston strikes periodical hammer-blows. Under the influence of the hammer-blows the impact tip, which is buffered on the machine housing via a compression spring, advances oscillatingly through the ground and finally, when it comes to the end of its stroke, it draws the housing after it.

The impact tip of the ram drilling machine can be formed as a chisel or, according to German Offenlegungsschrift No. 25 58 842, can be provided with blade-like cutters so as to break up any obstructions in the ground more easily. Furthermore such ram boring machines can also be combined at the rear end with a coupling for attaching a follow-up pipe. In this way it is possible to pull a supply pipe even through ground crossed by obstructions such as old pipes without trenching.

From German patent specification No. 28 24 915 it is also known to use such ram boring machines to widen out a pilot hole, which may even be an existing supply pipe. Since the widening out of the supply pipe, for example a cast iron or earthenware pipe, requires it first to be broken up, it is also known to provide the impact tip with cutter or impact blades pointing radially outwards or arranged in the axial plane of the impact tip. In this case the cutting edges run at an acute angle to the axis of the impact tip, so that they act together much like a spreader cone but break apart the wall of the previously-laid pipe as the impact tip moves forwards.

Since the impact tip and the cutters form a constructional unit that is either part of a ram boring machine or is connected to a ram boring machine, the operations of driving forwards, forcing aside and breaking up are always performed at the same time. This results either in increased impact energy or in a slower advance. Moreover the impact energy is frequently not enough to break apart the sleeve joints that are almost always present.

OBJECT OF THE INVENTION

The problem underlying the invention is therefore to provide a ram boring machine that operates with lower impact energy and/or allows a quicker advance.

SUMMARY OF THE INVENTION

The solution of the problem is based on the discovery that the machine can only advance when the breaking up operation has been performed.

Accordingly the teaching of the invention consists in forming the machine in two parts that are, within limits, moveable independently of one another.

More particularly, the invention consists in arranging, in the impact tip of a machine of the above-mentioned kind, impact blades that are moveable in the impact tip parallel to its axis and are struck by the impact piston. In doing this the impact piston at first transfers its energy predominantly or even wholly to the impact blades, and only when the impact blades have performed the disintegration operation and are not met by any resistance worth mentioning from the pipe or the ground, to the impact tip or the machine housing.

Thus in the ram boring machine according to the invention at first only the impact blades are struck and driven into the old pipe to be broken up and into the surrounding ground, while the position of the machine as such and of its impact tip remains substantially unchanged. Only when - mostly after several blows - a section of pipe and other possible obstructions in the ground are broken up does the machine and its impact tip move forward into the region of earth and pipe debris loosened by the impact blades. Thus the operations of breaking up and advancing or forcing aside constantly alternate. This brings with it the advantage that the maximum amount of impact energy is always available both for the breaking up operation and for the forcing aside and advancing operations.

In the ram boring machine according to the invention it is preferable for an anvil bar to be guided in cooperating relationship with the impact blades in a hole drilled in the tip. The striker piston imparts the whole of its energy to the rear end of this bar until the breaking up operation has been performed and the striker piston comes into contact with a stop shoulder which then absorbs the impact energy.

Alternatively the anvil bar can also be provided at its rear end with a head which transmits the energy of the impact piston to the stop shoulder when the breaking-up operation comes to an end.

The impact blades can be formed as double blades and extend through slots in the surface of the impact tip casing. They then point radially outwards like guiding fins and, during the breaking- up operation, they oscillate along the axis of the machine in the slots, the length of which corresponds to the maximum stroke of the blades. The front end of the anvil bar preferably engages in a rearward recess in the double blade.

In order to achieve a vibrating blade operation in the manner of a hammer drill the double blade can be guided by means of a guide slot on an inner spigot of the impact tip and be buffered against the impact tip through a compression spring. This results in the knife moving back a short distance under the influence of the compression spring after each blow so that it once again meets the pipe to be broken up on the next blow of the piston. The breaking- up of the pipe therefore takes place as a high-frequency impact cutting and consequently with high efficiency.

So as to be able to pull in a new pipe simultaneously with the breaking up of the old pipe, the ram boring machine either has a pipe coupling at its rear end or is combined with a tubular casing with a coupling or holder for the follow-up pipe. In this case the tubular casing can have a conical tip by means of which the hole formed in the ground by the impact tip is widened and thereby brought to a diameter slightly larger than that of the follow-up pipe. In this way an easy and low-friction pulling in of the follow-up pipe or the new supply line is possible.

BRIEF DESCRIPTION OF THE DRAWINGS

The invention will now be described in more detail by way of example with reference to two embodiments shown in the drawings. In the drawings:

FIG. 1 a longitudinal axial section through an old pipe and a ram boring machine according to the invention;

FIG. 2 shows the ram boring machine according to FIG. 1 with a different anvil bar;

FIG. 3 shows a plan view of the ram boring machine of FIG. 1 or FIG. 2;

FIG. 4 shows an exploded view of the impact tip of the machine according to FIG. 2 with the tubular casing.

DETAILS DESCRIPTION OF A PREFERRED EMBODIMENT OF THE INVENTION

The ram boring machine according to the invention comprises a housing 1 with a self-guiding striker piston and is supplied with compressed air through a pipe. In the front part of the housing 1 is housed an impact tip 3 having an eye 4 for the attachment of a traction rope. The impact tip has a central hole 5 as a guide for an anvil bar 6, which in the embodiment according to FIG. 2 is provided at its rear end with a head 7 and engages with its front end in the recess 8 of a double blade 9 moveably housed in the impact tip 3. The double blade is guided by a front guide slot on an inner bolt member 11 of the impact tip 3 and is buffered against this inner spigot through a compression spring 12 and a spring plate 13.

In the interior of the housing the rear end of the impact tip 3 forms a stop shoulder 15 for the striker piston 2.

The double blade 9 is provided with two opposed impact blades 14 that project through slots 16 in the impact tip and serve to break up an old pipe 17. Seated on the outside of the rear part of the impact tip is the conical tip of a tubular casing 18 that surrounds the ram boring machine 1 and has a tip 19 and a holder 20 for a follow-up pipe or for the new pipe to be laid.

In laying a new supply pipe 21 without trenching, the striker piston 2 constantly reciprocates in the housing 1, under the influence of compressed air supplied to it via a pipe, between the anvil bar 6 or its head 7 and a rearward end position; on striking the anvil bar 6 or its head 7 it initially imparts its energy solely to the impact blades 14 via the bar 6 and the double blade 9.

The more the old pipe 17 is broken up, the further can the impact blades 14 move forward against the pressure of the spring 12 under the influence of the blows of the striker piston 2, until finally the striker piston 2, in the embodiment of FIG. 1, or the anvil head 7, in the embodiment of FIG. 2, comes up against the stop shoulder 15. The striker piston then imparts its energy essentially to the impact tip 3 and thus to the housing 1. The housing, and with it the impact tip 3, then moves stepwise into the broken-up part of the old pipe 17 until the impact blades 14 come up against the unbroken end of the pipe and resume their rearward starting position shown in FIGS. 1 to 3. The anvil bar then again extends beyond the stop shoulder until a section of the old pipe is again broken up and the striker piston or the head 7 of the anvil bar again comes up against the stop shoulder 15.

Thus, under the influence of the compression spring 12 and, as the case may be, of a traction rope attached to the eye 4 on the one hand, and of the striker piston 2 on the other, the impact blades 14 constantly move to and fro in the rhythm of the movement of the striker piston, while the machine 1 and its impact tip 3 remain substantially fixed, until the breaking-up operation has been performed and the machine 1 and the impact tip 3 move forward stepwise under the influence of the striker piston 2 meeting the stop shoulder 15 with simultaneous forcing away of the ground region lying in front of the impact tip 3 and the tip 19 of the tubular casing, without a breaking-up operation being performed. Thus the laying of a new supply pipe is completed in two separate phases: a breaking-up phase with the machine at rest and an advancing and penetrating phase during which a breaking-up operation is not performed.

What is claimed is:

1. A ram boring machine for laying pipelines without trenching, comprising a housing having a front end, the housing defining a longitudinal axis, a striker piston guided in the housing of the machine and an impact tip fixed to the front end of the housing, the impact tip provided with impact blades, wherein the impact blades are movable in axial direction relative to the impact tip, the impact blades being acted upon by the striker piston.

2. A ram boring machine according to claim 1, wherein an anvil bar having a front end operatively connected to the impact blades is guided in a hole bored in the impact tip.

3. A ram boring machine according to claim 2, wherein the front end of the anvil bar engages in a recess in the rear of a double blade.

4. A ram boring machine according to claim 2, wherein the housing is provided with a stop shoulder.

5. A ram boring machine according to claim 2, wherein the anvil bar is provided with a head at its rear end.

6. A ram boring machine according to claim 1, wherein the impart blades project through axially extending slots defined in the impart tip.

7. A ram boring machine according to claim 3, wherein the double blade is guided by a guide slot on a bolt member inside the impact tip and is buffered against the impact tip via a compression spring.

8. A ram boring machine according to claim 1, comprising a tubular casing at least partly surrounding the housing and having a holder for a follow-up pipe.

9. A ram boring machine according to claim 8, wherein the tubular casing has a conical tip.

10. A ram boring machine according to claim 1, wherein the impact tip is provided with an eye.

11. A ram boring machine according to claim 2, wherein the housing includes an anvil bar guide, the anvil bar guide being provided with a stop shoulder.

* * * * *